(12) United States Patent
De Luca et al.

(10) Patent No.: US 8,580,890 B2
(45) Date of Patent: Nov. 12, 2013

(54) HETEROPHASIC PROPYLENE COPOLYMER WITH IMPROVED PROPERTIES FOR INJECTION MOLDING APPLICATIONS

(75) Inventors: Rita De Luca, Souvret (BE); Philippe Hoslet, La Hestre (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 93 days.

(21) Appl. No.: 13/001,982

(22) PCT Filed: Jul. 2, 2009

(86) PCT No.: PCT/EP2009/058304
§ 371 (c)(1),
(2), (4) Date: Apr. 6, 2011

(87) PCT Pub. No.: WO2010/000792
PCT Pub. Date: Jan. 7, 2010

(65) Prior Publication Data
US 2011/0177272 A1    Jul. 21, 2011

(30) Foreign Application Priority Data
Jul. 3, 2008  (EP) .................................. 08159634

(51) Int. Cl.
*C08L 23/10* (2006.01)
*C08L 23/14* (2006.01)
*C08L 23/16* (2006.01)

(52) U.S. Cl.
USPC .................. 525/53; 525/64; 525/69; 525/70; 525/88; 525/95; 525/240; 525/242; 525/243; 525/322; 525/323; 525/324

(58) Field of Classification Search
USPC ............. 525/240, 53, 64, 69, 70, 88, 95, 242, 525/243, 322, 323, 324
See application file for complete search history.

(56) References Cited

U.S. PATENT DOCUMENTS

| | | | |
|---|---|---|---|
| 2005/0234198 | A1 | 10/2005 | Tian et al. |
| 2007/0203298 | A1 * | 8/2007 | Massari et al. ................ 525/191 |
| 2008/0045638 | A1 | 2/2008 | Chapman et al. |
| 2009/0057961 | A1 | 3/2009 | McKeeman et al. |
| 2009/0118415 | A1 | 5/2009 | Aasetre et al. |

FOREIGN PATENT DOCUMENTS

| | | | |
|---|---|---|---|
| EP | 1916264 | A | 4/2008 |
| EP | 1935938 | A1 * | 6/2008 |
| WO | 2007147865 | A | 12/2007 |
| WO | 2008074423 | A1 | 6/2008 |

* cited by examiner

Primary Examiner — Roberto Rabago

(57) ABSTRACT

The present invention concerns a heterophasic propylene copolymer of high melt flow for injection molding, which comprise a propylene polymer matrix and a rubber. The heterophasic propylene copolymers of the present invention are characterized by a high viscosity of the rubber phase and a well-defined ratio of the intrinsic viscosities of the rubber phase and the propylene polymer matrix, thus resulting in improved mechanical properties. The present invention further relates to a process for the production of such heterophasic propylene copolymers, their use and articles produced with them.

12 Claims, No Drawings

HETEROPHASIC PROPYLENE COPOLYMER WITH IMPROVED PROPERTIES FOR INJECTION MOLDING APPLICATIONS

FIELD OF THE INVENTION

The present invention concerns heterophasic propylene copolymers of high melt flow for injection molding, which comprise a propylene polymer matrix and a rubber. The heterophasic propylene copolymers of the present invention are characterized by a high viscosity of the rubber phase and a well-defined ratio of the intrinsic viscosities of the rubber phase and the propylene polymer matrix, thus resulting in improved mechanical properties. The present invention further relates to a process for the production of such heterophasic propylene copolymers, their use and articles produced with them.

THE TECHNICAL PROBLEM AND THE PRIOR ART

Polypropylene offers a unique combination of good economics with good properties, such as good thermal properties, chemical resistance, or processability. However, propylene homopolymers and random copolymers have the major drawback of being deficient in impact strength, particularly at lower temperatures. Only with the introduction of an impact modifier, such as a rubber, into propylene homopolymer or random copolymer has it been possible to overcome this deficiency and extend the use of polypropylene into applications that require increased impact strength.

The blending of a propylene homopolymer or random copolymer, either by compounding or directly in the polymerization process, with a rubber leads to a polypropylene with two distinct phases, the matrix phase and the rubber phase. This is the reason why such polypropylenes are best described as heterophasic propylene copolymers, though frequently they are also referred to as "impact copolymers" or just "propylene block copolymers". A typical example of such a heterophasic propylene copolymer is one with a propylene homopolymer or a propylene random copolymer matrix and an ethylene-propylene rubber (EPR).

Today heterophasic propylene copolymers are widely used for articles in packaging applications, toys, containers, and boxes to name only a few. Such articles are frequently produced by injection molding. Progress by machine manufacturers and polymer manufacturers have allowed reductions in cycle times and weight of the articles while maintaining the mechanical properties at increased melt flow of the polymer. Due to environmental and economic reasons there is continuing pressure to provide heterophasic propylene copolymers with ever increasing melt flow indices.

There is therefore a need in the industry to provide a heterophasic propylene copolymer having improved processability and/or good mechanical properties.

Thus, it is an objective of the present invention to provide a heterophasic propylene copolymer having good processability.

It is a further object of the present invention to provide a heterophasic propylene copolymer having good mechanical properties.

In particular, it is an object of the present invention to provide a heterophasic propylene copolymer having good impact strength.

Further, it is a particular object of the present invention to provide a heterophasic propylene copolymer having good stiffness.

BRIEF DESCRIPTION OF THE INVENTION

Any of the above objectives either alone or in any combination is solved by the heterophasic propylene copolymer of present invention.

The present invention therefore provides a heterophasic propylene copolymer comprising the following components
(A) a propylene polymer matrix (M) comprising a propylene homopolymer or a random copolymer of propylene and at least one further olefin different from propylene, said further olefin being present in up to 4.0 wt % relative to the total weight of the random copolymer, and
(B) a rubber (R) comprising
  (i) a first olefin, which is different from propylene,
  (ii) a second olefin, which is different from the first olefin,
wherein the heterophasic propylene copolymer has a melt flow index in the range from 45 dg/min to 75 dg/min, measured according to ISO 1133, condition L, 230° C., 2.16 kg,
wherein the rubber has an intrinsic viscosity of at least 2.4 dl/g and of at most 4.5 dl/g, measured in tetralin at 135° C. following ISO 1628, and wherein the ratio of the intrinsic viscosities, measured in tetralin at 135° C. following ISO 1628, of the rubber (R) and the propylene polymer matrix (M) $\eta_R/\eta_M$ is at least 3.5.

Further, the present invention provides for a process for the production of a heterophasic propylene copolymer comprising a propylene polymer matrix (M) and a rubber (R), in presence of a Ziegler-Natta polymerization catalyst, an aluminium alkyl, an external electron donor and hydrogen, comprising the steps of
  (a) producing a propylene polymer matrix (M) by polymerizing propylene to produce a propylene homopolymer or by copolymerizing propylene and at least one further olefin different from propylene to produce a random copolymer of propylene and at least one further olefin different from propylene, said further olefin being present in up to 4.0 wt % relative to the total weight of the so-produced random copolymer,
  (b) subsequently transferring said propylene polymer matrix obtained in step (a) to a further polymerization reactor, and
  (c) copolymerizing a first olefin, which is different from propylene, and a second olefin, which is different from the first olefin, to produce a rubber (R),
wherein the heterophasic propylene copolymer has a melt flow index in the range from 45 dg/min to 75 dg/min (measured according to ISO 1133, condition L, 230° C., 2.16 kg),
wherein the rubber has an intrinsic viscosity of at least 2.4 dl/g and of at most 4.5 dl/g (measured in tetralin at 135° C.), and
wherein the ratio of the intrinsic viscosities (measured in tetralin at 135° C.) of the rubber (R) and the propylene polymer matrix (M) $\eta_R/\eta_M$ is at least 3.5.

Furthermore, the present invention provides for articles produced with the heterophasic propylene copolymer of the present invention. It also provides for a process for producing such articles.

DETAILED DESCRIPTION OF THE INVENTION

We have now discovered that at least one of the above objectives can be met by providing a heterophasic propylene copolymer, which comprises
(A) a propylene polymer matrix (M), and
(B) a rubber (R),
wherein the intrinsic viscosity of the rubber has to be within a well-specified range and also fulfill certain conditions in relation to the intrinsic viscosity of the propylene polymer matrix. Because the propylene polymer matrix and the rubber are immiscible, the heterophasic propylene copolymer of the present invention is characterized by at least two distinct phases, with rubber particles dispersed within the propylene polymer matrix.

The heterophasic propylene copolymer has a melt flow index in the range from 45 dg/min to 75 dg/min. The melt flow index is measured in accordance with ISO 1133, condition L, at 230° C. with a weight of 2.16 kg. Preferably, the melt flow index is in the range from 50 dg/min to 70 dg/min, and most preferably in the range from 55 dg/min to 65 dg/min.

The propylene polymer matrix (M) of the heterophasic propylene copolymers of the present invention comprises a propylene homopolymer or a random copolymer of propylene and at least one further olefin different from propylene. Said further olefin is present in up to 4.0 wt % relative to the total weight of the random copolymer. Preferably it is present in up to 3.5 wt %, more preferably in up to 3.0 wt %, even more preferably in up to 2.5 wt % and most preferably in up to 2.0 wt % relative to the total weight of the random copolymer. Preferably said further olefin is an α-olefin. It may for example be ethylene, 1-butene, 1-pentene, 4-methyl-1-pentene, 1-hexene, or 1-octene.

The preferred propylene polymer matrix is a propylene homopolymer.

It is preferred that the propylene polymer matrix has a tacticity of more than 95.0% of mmmm pentads. The percentage of mmmm pentads is determined on the insoluble heptane fraction of the xylene soluble fraction according to the method described by G. J. Ray et al. in Macromolecules, vol. 10, no 4, 1977, p. 773-778). Preferably the tacticity is more than 96.0%, 97.0%, or 98.0% of mmmm pentads. In other words, it is preferred that the propylene polymer matrix is comprised of a propylene polymer that is predominantly isotactic.

If the propylene polymer matrix is a propylene homopolymer it is preferred that its xylene solubles content is at most 2.5 wt % and most preferably at most 2.0 wt %, relative to the total weight of the propylene homopolymer. The xylene solubles content is determined by dissolving the polypropylene in refluxing xylene, cooling of the solution to 25° C., filtering the solution, and subsequent evaporation of the solvent. The residue, which is the xylene soluble portion of the polypropylene, is then dried and weighed.

The propylene polymer matrix of the heterophasic propylene copolymer preferably has a molecular weight distribution, defined as the ratio $M_w/M_n$, of at least 5.0, preferably of at least 5.5, more preferably of at least 6.0, even more preferably of at least 6.5 and most preferably of at least 7.0. The molecular weight distribution can for example be determined by size exclusion chromatography.

The molecular weight distribution of the propylene polymer matrix may be monomodal or multimodal, for example bimodal. A multimodal molecular weight distribution is obtained by combining at least two propylene polymers having different melt flow indices, i.e. showing at least two peaks in a size exclusion chromatogram.

The rubber of the heterophasic propylene copolymer of the present invention comprises a first olefin, which is different from propylene, and a second olefin, which is different from the first olefin. Preferably, said first and second olefin are independently selected from the group consisting of ethylene and α-olefins. Specific examples for α-olefins that may be used are ethylene, propylene, 1-butene, 1-pentene, 4-methyl-1-pentene, 1-hexene, and 1-octene. As first olefin ethylene and butene are more preferred, with ethylene being most preferred. It is most preferred that the second olefin is propylene. Thus, the most preferred rubber is an ethylene-propylene rubber (EPR).

It is preferred that the first olefin is present in an amount of from 5.0 wt % to 11.0 wt % relative to the total weight of the heterophasic propylene copolymer, more preferably from 6.5 wt % to 9.5 wt %, even more preferably from 7.0 wt % to 9.0 wt %, and most preferably from 7.5 wt % to 8.5 wt %.

For the present invention it is preferred that the rubber is present in an amount from 10.0 wt % to 22.0 wt %, preferably from 14.0 wt % to 18.0 wt %, more preferably from 14.5 wt % to 17.5 wt % and most preferably from 15.0 wt % to 17.0 wt % relative to the total weight of the heterophasic propylene copolymer. The rubber content of the heterophasic propylene copolymer is determined as the acetone insoluble content. The acetone insoluble fraction is obtained by dissolving the polypropylene in refluxing xylene, cooling of the solution to 25° C., filtering the solution, and agitating the filtrate together with acetone, during which time a precipitate is formed. The precipitate is collected, dried and weighed.

For the present invention it is preferred that at least 50% of the rubber particles, which are dispersed in the propylene polymer matrix, have a size of at most 1.0 μm, more preferably in the range from 0.2 μm to 1.0 μm, even more preferably in the range from 0.4 μm to 0.8 μm and most preferably in the range from 0.5 μm to 0.6 μm. It has been surprisingly found that the selected range of rubber particle size helps in improving the balance between impact properties and stiffness. The rubber particle size is determined on pellets of the heterophasic propylene copolymer, i.e. of polymer obtained after the polymerization process and pelletized in an extruder at a temperature above the melting point. A cut sample is first treated with a solution of $RuO_4$ for 2 to 3 hours, then cut into slices having a thickness from 150 nm to 180 nm. These slices are then analyzed by transmission electron microscopy (TEM). The recorded pictures are analyzed using commercially available software to determine the particle size of the rubber particles.

The rubber of the heterophasic propylene copolymer has an intrinsic viscosity (measured in tetralin at 135° C. following ISO 1628) of at least 2.4 dl/g, preferably of at least 2.5 dl/g and most preferably of at least 2.6 dl/g. The intrinsic viscosity of the rubber is at most 4.5 dl/g, preferably at most 4.0 dl/g, more preferably at most 3.5 dl/g, even more preferably at most 3.2 dl/g, still more preferably at most 3.0 dl/g or 2.9 dl/g and most preferably at most 2.8 dl/g.

For the present invention it is essential that the ratio of the intrinsic viscosities (measured in tetralin at 135° C. following ISO 1628) of the rubber (R) and the propylene polymer matrix (M), $\eta_R/\eta_M$, is at least 3.5. Preferably the ratio $\eta_R/\eta_M$ is at least 3.6, more preferably at least 3.7, even more preferably at least 3.8 and most preferably at least 3.9.

Preferably, the propylene polymer matrix and the rubber, when taken together, comprise at least 90.0 wt % of the heterophasic propylene copolymer. More preferably, they comprise at least 95.0 wt % or 97.0 wt % or 99.0 wt %, even more preferably at least 99.5 wt % of the heterophasic propylene copolymer. Most preferably the heterophasic propylene copolymer essentially consists of the propylene polymer matrix and the rubber.

The heterophasic propylene copolymer of the present invention may also comprise additives, such as for example antioxidants, light stabilizers, acid scavengers, lubricants, antistatic agents, fillers, nucleating agents, clarifying agents, colorants. An overview of useful additives is given in Plastics Additives Handbook, ed. H. Zweifel, 5th edition, Hanser Publishers.

Preferably, the heterophasic propylene copolymers may contain one or more nucleating agents. The nucleating agent used in the present invention can be any of the nucleating agents known to the skilled person. It is, however, preferred that the nucleating agent be selected from the group consisting of talc, carboxylate salts, sorbitol acetals, phosphate ester salts, substituted benzene tricarboxamides and polymeric nucleating agents, as well as blends of these. The most preferred nucleating agents are talc, carboxylate salts, and phosphate ester salts.

The carboxylate salts used as nucleating agents in the present invention can be organocarboxylic acid salts. Particular examples are sodium benzoate and lithium benzoate. The organocarboxylic acid salts may also be alicyclic organocarboxylic acid salts, preferably bicyclic organodicarboxylic acid salts and more preferably a bicyclo[2.2.1]heptane dicarboxylic acid salt. A nucleating agent of this type is sold as HYPERFORM® HPN-68 by Milliken Chemical.

Examples for sorbitol acetals are dibenzylidene sorbitol (DBS), bis(p-methyl-dibenzylidene sorbitol) (MDBS), bis(p-ethyl-dibenzylidene sorbitol) and bis(3,4-dimethyl-dibenzylidene sorbitol) (DMDBS). Bis(3,4-dimethyl-dibenzylidene sorbitol) (DMDBS) is preferred. These can for example be obtained from Milliken Chemical under the trade names of Millad 3905, Millad 3940 and Millad 3988.

Examples of phosphate ester salts are salts of 2,2'-methylene-bis-(4,6-di-tert-butylphenyl)phosphate. Such phosphate ester salts are for example available as NA-11 or NA-21 from Asahi Denka.

Examples of substituted tricarboxamides are those of general formula (I)

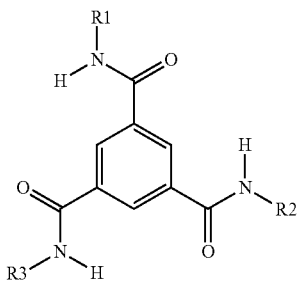

wherein R1, R2 and R3, independently of one another, are selected from $C_1$-$C_{20}$ alkyls, $C_5$-$C_{12}$ cycloalkyls, or phenyl, each of which may in turn by substituted with $C_1$-$C_{20}$ alkyls, $C_5$-$C_{12}$ cycloalkyls, phenyl, hydroxyl, $C_1$-$C_{20}$ alkylamino or $C_1$-$C_{20}$ alkyloxy etc. Examples for $C_1$-$C_{20}$ alkyls are methyl, ethyl, n-propyl, n-butyl, iso-butyl, tert-butyl, n-pentyl, isopentyl, 1,1-dimethylpropyl, 1,2-dimethylpropyl, 3-methylbutyl, hexyl, heptyl, octyl or 1,1,3,3-tetramethylbutyl. Examples for $C_5$-$C_{12}$ cycloalkyl are cyclopentyl, cyclohexyl, cyclooctyl, cyclododecyl, adamantyl, 2-methylcyclohexyl, 3-methylcyclohexyl or 2,3-dimethylcyclohexyl. Such nucleating agents are disclosed in WO 03/102069 and by Blomenhofer et al. in Macromolecules 2005, 38, 3688-3695.

Examples of polymeric nucleating agents are polymeric nucleating agents containing vinyl compounds, which are for example disclosed in EP-A1-0152701 and EP-A2-0368577. The polymeric nucleating agents containing vinyl compounds can either be physically or chemically blended with the polypropylene. In physical blending the polymeric nucleating agent containing vinyl compounds is mixed with the polypropylene in an extruder or in a blender. In chemical blending the polypropylene comprising the polymeric nucleating agent containing vinyl compounds is produced in a polymerization process having at least two stages, in one of which the polymeric nucleating agent containing vinyl compounds is produced. Preferred vinyl compounds are vinyl cycloalkanes or vinyl cycloalkenes having at least 6 carbon atoms, such as for example vinyl cyclopentane, vinyl-3-methyl cyclopentane, vinyl cyclohexane, vinyl-2-methyl cyclohexane, vinyl-3-methyl cyclohexane, vinyl norbornane, vinyl cylcopentene, vinyl cyclohexene, vinyl-2-methyl cyclohexene. The most preferred vinyl compounds are vinyl cyclopentane, vinyl cyclohexane, vinyl cyclopentene and vinyl cyclohexene.

Further, it is possible to use blends of nucleating agents, such as for example a blend of talc and a phosphate ester salt or a blend of talc and a polymeric nucleating agent containing vinyl compounds.

While it is clear to the skilled person that the amount of nucleating agent to be added depends upon its crystallization efficiency, for the purposes of the present invention the nucleating agent or the blend of nucleating agents is present in the polypropylene in an amount of at least 50 ppm, preferably at least 100 ppm. It is present in an amount of at most 10000 ppm, preferably of at most 5000 ppm, more preferably of at most 4000 ppm, even more preferably of at most 3000 ppm and most preferably of at most 2000 ppm.

The heterophasic propylene copolymers of the present invention, which comprise a propylene polymer matrix (M) and a rubber (R), are produced in presence of a Ziegler-Natta catalyst, an aluminium alkyl, an external electron donor (ED) and hydrogen.

A Ziegler-Natta catalyst comprises a titanium compound, which has at least one titanium-halogen bond, and an internal donor, both supported on magnesium halide in active form. The internal donor is a compound selected from the group consisting of phthalates, diethers, succinates, di-ketones, enamino-imines and any blend of these. The preferred internal donor is a compound selected from the group consisting of phthalates, diethers, succinates and any blend of these.

Suitable phthalates are selected from the alkyl, cycloalkyl and aryl phthalates, such as for example diethyl phthalate, diisobutyl phthalate, di-n-butyl phthalate, dioctyl phthalate, diphenyl phthalate and benzylbutyl phthalate. Such catalysts are for example commercially available from Basell under the Avant trade name.

Suitable diethers are 1,3-diethers of formula $R^1R^2C(CH_2OR^3)(CH_2OR^4)$ wherein $R^1$ and $R^2$ are the same or different and are $C_1$-$C_{18}$ alkyl, $C_3$-$C_{18}$ cycloalkyl or $C_7$-$C_{18}$ aryl radicals; $R^3$ and $R^4$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are disclosed in published European patent applications EP-A-0 361 493 and EP-A-0 728 769. Representative examples of said diethers are 2-methyl-2-isopropyl-1,3-dimethoxypropane; 2,2-diisobutyl-1,3-dimethoxypropane; 2-isopropyl-2-cyclopentyl-1,3-dimethoxypropane; 2-isopropyl-2-isoamyl-1,3-dimethoxypropane; 9,9-bis(methoxymethyl)fluorene.

Suitable succinate compounds have the formula

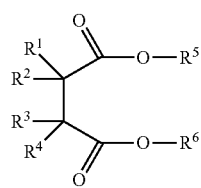

wherein $R^1$ to $R^4$ are equal to or different from one another and are hydrogen, or a $C_1$-$C_{20}$ linear or branched alkyl, alkenyl, cycloalkyl, aryl, arylalkyl or alkylaryl group, optionally containing heteroatoms, and $R^1$ to $R^4$, being joined to the same carbon atom, can be linked together to form a cycle; and $R^5$ and $R^6$ are equal to or different from one another and are a linear or branched alkyl, alkenyl, cycloalkyl, aryl, arylalkyl or alkylaryl group, optionally containing heteroatoms.

Suitable di-ketones are 1,3-di-ketones of formula

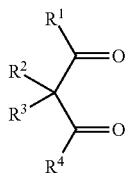

wherein $R^2$ and $R^3$ are equal to or different from one another and are hydrogen, or a C1-C20 linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are equal to or different from one another and are a linear or branched alkyl, alkenyl, cycloalkyl, aryl, arylalkyl or alkylaryl group, optionally containing heteroatoms.

Suitable enamino-imines have the general formula

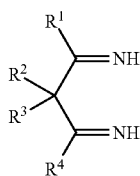

wherein $R^2$ and $R^3$ are equal to or different from one another and are hydrogen, or a C1-C20 linear or branched alkyl, alkenyl, cycloalkyl, aryl, arylalkyl or alkylaryl group, optionally containing heteroatoms, and $R^2$ and $R^3$, being joined to the same carbon atom, can be linked together to form a cycle; and $R^1$ and $R^4$ are equal to or different from one another and are a linear or branched alkyl, alkenyl, cycloalkyl, aryl, arylalkyl or alkylaryl group, optionally containing heteroatoms.

The organoaluminium compound is advantageously an Al-alkyl compound of the Al-trialkyls family, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. Al-triethyl is preferred. Advantageously, the Al-trialkyl has a hydride content, expressed as $AlH_3$, of less than 1.0 wt % with respect to the Al-trialkyl. More preferably, the hydride content is less than 0.5 wt %, and most preferably the hydride content is less than 0.1 wt %.

The organoaluminium compound is preferably used in such an amount as to have a molar ratio Al/Ti in the range from 1 to 1000. More preferably, the molar ratio Al/Ti is at most 250. Most preferably it is at most 200.

Suitable external electron donors (ED) include certain silanes, ethers, esters, amines, ketones, heterocyclic compounds and blends of these. It is preferred to use a 1,3-diether or a silane. It is most preferred to use a silane of the general formula

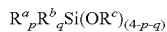

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are $(tert\text{-}butyl)_2Si(OCH_3)_2$, (cyclohexyl)(methyl) $Si(OCH_3)_2$ (referred to as "C donor"), $(phenyl)_2Si(OCH_3)_2$ and $(cyclopentyl)_2Si(OCH_3)_2$ (referred to as "D donor").

The molar ratio of organoaluminium compound to external donor ("Al/ED") ranges advantageously between 1 and 500. Preferably the molar ratio Al/ED is at most 100, more preferably at most 50, even more preferably at most 20, and most preferably at most 10. Preferably the molar ratio Al/ED is at least 2.

Hydrogen is used to control the length of the polymer chains. For the production of polymers with higher MFI, i.e. with lower average molecular weight and shorter polymer chains, the concentration of hydrogen in the polymerization medium needs to be increased. Inversely, the hydrogen concentration in the polymerization medium has to be reduced in order to produce polymers with lower MFI, i.e. with higher average molecular weight and longer polymer chains.

For the present invention the polymerization of olefins may be carried out according to known techniques. If the olefin is propylene the polymerization may for example be carried out in liquid propylene as reaction medium. Otherwise, it may be carried out in a diluent, such as an inert hydrocarbon (slurry polymerization) or in the gas phase.

Thus, the process for the production of a heterophasic propylene copolymer comprising a propylene polymer matrix (M) and a rubber (R), in presence of a Ziegler-Natta polymerization catalyst, an aluminium alkyl, an external electron donor and hydrogen, comprises the steps of (a) producing a propylene polymer matrix (M), by polymerizing propylene to produce a propylene homopolymer or by copolymerizing propylene and at least one further olefin different from propylene to produce a random copolymer of propylene and at least one further olefin different from propylene, said further olefin being present in up to 4.0 wt % relative to the total weight of the so-produced random copolymer, (b) subsequently transferring said propylene polymer matrix obtained in step (a) to a further polymerization reactor, and (c) copolymerizing a first olefin, which is different from propylene, and a second olefin, which is different from the first olefin, to produce a rubber, It is clear to the skilled person that either of steps (a) and (c) can be performed in more than one polymerization reactor.

For the process of the present invention it is essential that the so-produced heterophasic propylene copolymer has a melt flow index in the range from 45 dg/min to 75 dg/min (measured according to ISO 1133, condition L, 230° C., 2.16 kg). Preferably the melt flow index is in the range from 50 dg/min to 70 dg/min, and most preferably it is in the range from 55 dg/min to 65 dg/min. As explained previously, hydrogen is used to control the melt flow index.

It is also essential that the rubber made in step (c) is produced in such a way that it has an intrinsic viscosity (measured in tetralin at 135° C. following ISO 1628) of at least 2.4 dl/g. Preferably, the intrinsic viscosity of the rubber is of at least 2.5 dl/g and most preferably of at least 2.6 dl/g. The intrinsic viscosity of the rubber is at most 4.5 dl/g, preferably at most 4.0 dl/g, more preferably at most 3.5 dl/g, even more preferably at most 3.2 dl/g, still more preferably of at most 3.0 dl/g or 2.9 dl/g and most preferably of at most 2.8 dl/g.

For the process of the present invention it is also essential that the ratio of the intrinsic viscosities (measured in tetralin at 135° C. following ISO 1628) of the rubber (R) and the propylene polymer matrix (M), $\eta_R/\eta_M$, is at least 3.5.

Preferably the ratio $\eta_R/\eta_M$ is at least 3.6, more preferably at least 3.7, even more preferably at least 3.8 and most preferably at least 3.9.

For the production of heterophasic propylene copolymers the polymerization is preferably carried out in one or more polymerization reactors in series, employing liquid propylene as reaction medium, and then in one or more gas phase reactors in series, as is done for example in a propylene polymer production line based on Spheripol technology. It is preferred to produce a heterophasic propylene copolymer sequentially in one or more loop reactors and then in one or more gas phase reactors. It is most preferred to employ only one gas phase reactor.

In the case that the heterophasic propylene copolymer is produced in a polymer production line with three polymerization reactors, the first two reactors are used to polymerize propylene to form the propylene polymer matrix and the third reactor is used to copolymerize a first olefin and a second olefin so as to produce the rubber. Preferably, the contribution of the first reactor to the total of the propylene polymer matrix is in the range from 40 wt % to 60 wt %, preferably in the range from 45 wt % to 55 wt % and most preferably in the range from 45 wt % to 50 wt %.

When the propylene polymer matrix is produced in more than one polymerization reactor, i.e. in at least two polymerization reactors, the propylene polymer may comprise fractions of propylene polymers that differ in average molecular weight and melt flow index. The molecular weight distribution of the resulting propylene polymer is multimodal. Otherwise, the molecular weight distribution is monomodal, i.e. the fractions do not differ significantly in average molecular weight and melt flow index.

A multimodal molecular weight distribution can be obtained by producing the fractions of the propylene polymer matrix in the at least two polymerization reactors under different polymerization conditions. The most convenient way to do so is having different hydrogen concentrations in the polymerization reactors.

For the present invention propylene homopolymers and random copolymers are preferably produced by polymerization in liquid propylene at temperatures in the range from 20° C. to 100° C. Preferably, temperatures are in the range from 60° C. to 80° C. The pressure can be atmospheric or higher. It is preferably between 25 and 50 bar.

Polymerization conditions, reactants' feed rates etc. are set in such a way as to result in the production of the heterophasic propylene copolymer with the characteristics that have been mentioned before. This is well within the skills of the person skilled in the art and does not require further details.

The heterophasic propylene copolymer is recovered as a powder after the last of the sequential polymerization reactors. It is optionally additivated with the already mentioned additives and can then be pelletized or granulated.

The heterophasic propylene copolymer of the present invention is particularly suited for the production of injection-molded articles. The injection molding process comprises the steps of
(a) melting the heterophasic propylene copolymer of the present invention, and
(b) injecting the molten heterophasic propylene copolymer from step (a) into an injection mold to form an injection-molded article.

The injection molding is performed using methods and equipment well known to the person skilled in the art. The heterophasic propylene copolymer is preferably injected into the injection mold at a melt temperature in the range from 200° C. to 300° C., more preferably in the range from 220° to 280° C.

The heterophasic propylene copolymer can be used for any article that is produced by injection molding. Examples of such articles may be pails, buckets, toys, household appliances, containers, caps, closures, and crates, to only name a few. The heterophasic propylene copolymer of the present invention is most particularly suited for pails and buckets.

EXAMPLES

The advantages of the heterophasic propylene copolymers of the present invention over those of the prior art are shown in the following examples. The heterophasic propylene copolymers used in the examples comprise a propylene homopolymer (PPH) as matrix (M) and an ethylene-propylene rubber (EPR) as rubber (R).

Test Methods

Melt flow (MFI) is measured according to norm ISO 1133, condition L, 230° C., 2.16 kg.

Xylene solubles (XS) are determined as follows: Between 4.5 and 5.5 g of propylene polymer are weighed into a flask and 300 ml xylene are added. The xylene is heated under stirring to reflux for 45 minutes. Stirring is continued for 15 minutes exactly without heating. The flask is then placed in a thermostat bath set to 25° C.+/−1° C. for 1 hour. The solution is filtered through Whatman no 4 filter paper and exactly 100 ml of solvent are collected. The solvent is then evaporated and the residue dried and weighed. The percentage of xylene solubles ("XS") is then calculated according to $$XS(\text{in wt \%}) = (\text{Weight of the residue/Initial total weight of } PP)*300$$

Acetone insolubles are determined as follow: 100 ml of the filtrate of the solution in xylene (see above) and 700 ml of acetone are agitated overnight at room temperature in a hermetically sealed flask, during which time a precipitate is formed. The precipitate is collected on a metal mesh filter with a mesh width of 0.056 mm, dried and weighed. The percentage of acetone insolubles ("AcIns") is then calculated according to $$AcIns(\text{in wt \%}) = (\text{Weight of the residue/Initial weight of } PP)*300$$

The amount of ethylene-propylene rubber in heterophasic propylene copolymer is determined as the acetone insoluble fraction of the xylene soluble fraction.

Molecular weights and molecular weight distribution is determined by Size Exclusion Chromatography (SEC) at high temperature (145° C.). A 10 mg PP sample is dissolved at 160° C. in 10 ml of TCB (technical grade) for 1 hour. The analytical conditions for the Alliance GPCV 2000 from WATERS are:
Volume: +/−400 µl
Injector temperature: 140° C.
Column and detector: 145° C.
Column set: 2 Shodex AT-806MS and 1 Styragel HT6E
Flow rate 1 ml/min
Detector: Refractive index
Calibration: Narrow standards of polystyrene
Calculation: Based on Mark-Houwink relation ($\log(M_{PP}) = \log(M_{PS}) - 0.25323$)

The total ethylene content (% $C_2$) is determined by NMR analysis of pellets according to the method described by G. J. Ray et al. in Macromolecules, vol. 10, no 4, 1977, p. 773-778.

The intrinsic viscosity of the propylene homopolymer (PPH) of the matrix (M) is determined on a collected sample of PPH produced at the end of the homopolymerization process. The intrinsic viscosity is determined in a capillary viscometer in tetralin at 135° C. following ISO 1628.

The intrinsic viscosity of the ethylene-propylene rubber (EPR) is determined using the acetone insoluble fraction of the xylene soluble fraction of the heterophasic propylene copolymer. The intrinsic viscosity is determined in a capillary viscometer in tetralin at 135° C.

Flexural modulus was measured according to ISO 178.

Notched Izod impact strength was measured according to ISO 180.

Heterophasic Propylene Copolymers

The heterophasic propylene copolymers used in the examples were produced in a pilot plant having two 150 l loop reactors and a gas phase reactor in series. As catalyst, a Ziegler-Natta catalyst with a phthalate as internal donor, was used. The catalyst is commercially available from Basell as Avant ZN111. External donor was (cyclopentyl)$_2$Si(OCH$_3$)$_2$ (D donor). Further polymerization conditions are given in table 1. Properties of the propylene homopolymer matrix (PPH) and the ethylene-propylene rubber (EPR) are shown in table 2, properties of the heterophasic propylene copolymer in table 3.

After being recovered from the gas phase reactor the heterophasic propylene copolymers were recovered, additivated with an antiacid, a nucleating agent and sufficient amounts of antioxidants to withstand degradation during processing and use,

TABLE 1

| | Unit | Example 1 | Comp. ex. 1 |
|---|---|---|---|
| Catalyst | | Phthalate | Phthalate |
| External Donor (ED) | | D | D |
| Catalyst Activation | | | |
| TEAL/Propylene | g/kg | ca. 0.15 | ca. 0.15 |
| TEAL/ED | g/g | 3-4 | 3-4 |
| GPR - EPR | | | |
| C$_2$/C$_2$ + C$_3$ | | 0.38 | 0.38 |

TABLE 2

| | Unit | Example 1 | Comp. ex. 1 |
|---|---|---|---|
| Matrix - PPH | | | |
| MFI | dg/min | 130 | 75 |
| $\eta_M$ | dl/g | 0.64 | 0.85 |
| Rubber - EPR | | | |
| $\eta_R$ | dl/g | 2.6-2.8 | 2.2 |
| Ratio $\eta_R/\eta_M$ | | 4.06-4.38 | 2.59 |

TABLE 3

| | Unit | Example 1 | Comp. ex. 1 |
|---|---|---|---|
| MFI | dg/min | 54 | 45 |
| C$_2$ content | wt % | 8.1 | 7.5 |
| Acetone Insoluble content | wt % | 14.1 | 15.0 |
| Xylene Solubles PPH | wt % | 1.9 | 1.9 |
| Flexural modulus | MPa | 1490 | 1500 |
| Izod, notched @ 23° C. | kJ/m$^2$ | 8.0 | 7.5 |

The results clearly show that the heterophasic propylene copolymer of example 1, in spite of the increased melt flow index, gives improved mechanical properties over the respective heterophasic propylene copolymer of comparative example 1, i.e. of the prior art. A closer comparison of the mechanical properties shows that the inventors have succeeded in improving the impact strength while maintaining the flexural modulus.

In consequence, the heterophasic propylene copolymer of the present invention allows cycle time reductions in injection molding due to the higher melt flow index but retaining the mechanical properties of the finished injection molded article.

The invention claimed is:

1. A heterophasic propylene copolymer, comprising:
a propylene polymer matrix (M) comprising a propylene homopolymer or a random copolymer of propylene and at least one further olefin different from propylene, wherein the further olefin is present in amounts up to 4.0 wt % relative to the total weight of the random copolymer, and a rubber (R) comprising a first olefin, which is different from propylene, and a second olefin, which is different from the first olefin;
wherein the heterophasic propylene copolymer has a melt flow index ranging from 45 to 75 dg/min, measured according to ISO 1133, condition L, at 230° C., 2.16 kg;
wherein the rubber has an intrinsic viscosity ranging from 2.4 to 4.5 dl/g, measured in tetralin at 135° C. following ISO 1628;
wherein the ratio of the intrinsic viscosities, measured in tetralin at 135° C. following ISO 1628, of the rubber (R) and the propylene polymer matrix (M), ηR/ηM, is at least 3.5; and
wherein rubber particles are dispersed within the propylene polymer matrix, wherein at least 50% of the rubber particles have a size of at most 1.0 μm, determined on pellets by transmission electron microscopy.

2. The heterophasic propylene copolymer of claim 1, wherein the rubber is present in amounts ranging from 10.0 to 22.0 wt % relative to the total weight of the heterophasic propylene copolymer.

3. The heterophasic propylene copolymer of claim 1, wherein the first olefin of the rubber is present in amounts ranging from 5.0 to 11.0 wt % relative to the total weight of the heterophasic propylene copolymer.

4. The heterophasic propylene copolymer of claim 1, wherein the propylene polymer matrix (M) is a propylene homopolymer (PPH) having a tacticity of more than 95.0% of mmmm pentads, wherein the percentage of mmmm pentads is determined on an insoluble heptane fraction of a xylene soluble fraction.

5. The heterophasic propylene copolymer of claim 1, wherein the propylene polymer matrix (M) is a propylene homopolymer (PPH) having a xylene solubles content of at most 2.5 wt % relative to the total weight of the propylene homopolymer.

6. The heterophasic propylene copolymer of claim 1, wherein the first and the second olefin of the rubber are independently selected from the group consisting of ethylene and α-olefins.

7. The heterophasic propylene copolymer of claim 1, wherein the first olefin of the rubber is ethylene or butene.

8. The heterophasic propylene copolymer of claim 1, wherein the second olefin of the rubber is propylene.

9. A process for producing a heterophasic propylene copolymer, comprising:

obtaining a propylene polymer matrix (M) by polymerizing propylene to produce a propylene homopolymer or by copolymerizing propylene and at least one further olefin different from propylene to produce a random copolymer of propylene and at least one further olefin different from propylene, wherein the at least one further olefin is present in amounts up to 4.0 wt % relative to the total weight of the random copolymer;

subsequently transferring the obtained propylene polymer matrix to a further polymerization reactor;

copolymerizing a first olefin, which is different from propylene, and a second olefin, which is different from the first olefin, to produce a rubber (R); and obtaining a heterophasic propylene copolymer;

wherein the heterophasic propylene copolymer has a melt flow index ranging from 45 to 75 dg/min, measured according to ISO 1133, condition L, at 230° C., 2.16 kg;

wherein the rubber has an intrinsic viscosity ranging from 2.4 to 4.5 dl/g, measured in tetralin at 135° C. following ISO 1628;

wherein the ratio of the intrinsic viscosities, measured in tetralin at 135° C. following ISO 1628, of the rubber (R) and the propylene polymer matrix (M), $\eta R/\eta M$, is at least 3.5; and wherein rubber particles are dispersed within the propylene polymer matrix, wherein at least 50% of the rubber particles have a size of at most 1.0 µm, determined on pellets by transmission electron microscopy.

10. A process for the production of articles, comprising:

melting the heterophasic propylene copolymer of claim 1 to obtain a molten heterophasic propylene copolymer; and injecting the molten heterophasic propylene copolymer into an injection mold to form an injection-molded article.

11. An article produced from the heterophasic propylene copolymer of claim 1.

12. The article of claim 11, wherein the article is a pail or a bucket.

* * * * *